(12) United States Patent
Payne et al.

(10) Patent No.: US 7,550,735 B2
(45) Date of Patent: Jun. 23, 2009

(54) GATE SEMICONDUCTOR FOR RADIATION DETECTION

(75) Inventors: Stephen A. Payne, Castro Valley, CA (US); Arnold Burger, Nashville, TN (US); Krishna C. Mandal, Ashland, MA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 11/824,094

(22) Filed: Jun. 29, 2007

(65) Prior Publication Data

US 2009/0001277 A1 Jan. 1, 2009

(51) Int. Cl.
*G01T 1/24* (2006.01)
*H01L 27/146* (2006.01)

(52) U.S. Cl. .............................. 250/370.12; 250/370.09
(58) Field of Classification Search ............ 250/370.12, 250/370.09
See application file for complete search history.

(56) References Cited

U.S. PATENT DOCUMENTS

| | | | |
|---|---|---|---|
| 6,255,708 B1 * | 7/2001 | Sudharsanan et al. ....... | 257/428 |
| 6,645,787 B2 * | 11/2003 | Nemirovsky et al. ......... | 438/56 |
| 2007/0036700 A1 * | 2/2007 | Redden et al. ................ | 423/99 |
| 2007/0099359 A1 * | 5/2007 | Klimov et al. .............. | 438/183 |
| 2007/0276455 A1 * | 11/2007 | Fiset ........................... | 607/91 |

OTHER PUBLICATIONS

Pal et al., "Deep level transient spectroscopy of anisotropic semiconductor GaTe", Bull. Mater. Sci., vol. 17, No. 4, Aug. 1994, pp. 347.*
Aydinli et al. "Anharmonicity in GaTe layered crystals", Crystal Research and Technology, vol. 37, Sep. 18, 2002, pp. 1303-1309.*

* cited by examiner

*Primary Examiner*—David P. Porta
*Assistant Examiner*—Mindy Vu
(74) *Attorney, Agent, or Firm*—John P. Wooldridge; John H. Lee (57) ABSTRACT

GaTe semiconductor is used as a room-temperature radiation detector. GaTe has useful properties for radiation detectors: ideal bandgap, favorable mobilities, low melting point (no evaporation), non-hygroscopic nature, and availability of high-purity starting materials. The detector can be used, e.g., for detection of illicit nuclear weapons and radiological dispersed devices at ports of entry, in cities, and off shore and for determination of medical isotopes present in a patient.

34 Claims, 5 Drawing Sheets

GATE SEMICONDUCTOR FOR RADIATION DETECTION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to radiation detectors, and more specifically, it relates to high-performance, room temperature gamma-ray detectors.

2. Description of Related Art

Presently, semiconductor radiation detectors serve a crucial role in detecting illicit nuclear weapons and radiological dispersal devices (RDDs) by virtue of their ability to distinguish isotopes. The best performer in this arena is the germanium (Ge) detector which has resolution of 0.2%, although they do require cooling to cryogenic temperature to function properly (<110 degrees K). Ge detectors are large, >6 cm in length, and consequently are sensitive. Nevertheless, the cooling requirement increases power consumption. Cool down takes about an hour and the battery must be replenished after ~8 hours, requiring logistical support for operations. Consequently, there has been an enormous effort to develop CZT (CdZnTe) as a RT alternative to Ge, mainly in terms of perfecting the crystal growth. While there has been substantive progress in CZT detectors, mastering the complexities of crystal growth and device fabrication has proved elusive. The effort has yielded typical detectors limited to ~2% resolution, while <0.5% is desired to reduce false alarms by isotope identification. Moreover, it has proved extremely difficult to produce single-crystal material greater than 1.5 cm in size, and the poor yield from crystal boules is expected to impede the widespread fielding of these devices. Currently, the desire to identify and develop a RT detector with 0.5% resolution is paramount in detection scenarios in order to adequately distinguish between isotopes, as is the need for a semiconductor that is larger (for higher efficiency), more available, and lower cost.

The applications of RT semiconductor radiation detectors are extensive, involving handheld devices for primary and secondary inspection of packages and cargo containers, as well as simple pager-type devices that can hang on the belts of government workers in a ubiquitous deployment strategy (i.e., on the persons of police, postal workers, etc., wherein the detection of dangerous isotopes is transmitted to a central information processing computer).

The utility of a compact, inexpensive, sensitive, high-resolution RT radiation detector is enabling and can barely be overstated since they will be used in all ports-of-entry (shipping, airports, borders), as well as throughout cities and for entry into buildings and special events. Moreover, they would be used in military operations in foreign lands and for routine monitoring. Government agencies with immediate compelling needs include the Departments of Energy and Defense, Homeland Security, Intelligence Agencies, Emergency Response, and the Coast Guard. Other agencies such as DARPA, DTRA, and NASA are also interested in robust semiconductor radiation detectors for military and scientific purposes. It could be stated that the necessity of this particular device is one of the most urgent matters facing us in the detection of nuclear weapons and RDDs.

Many semiconductor candidates have been considered for use as room temperature (RT) radiation detectors. The semiconductor properties used to characterize RT radiation detectors include bandgap energy, melting point, maximum atomic number, resiliency and growth parameters. The bandgap energy ($E_{GAP}$) should be >1.4 eV to allow near-room temperature operation with high resistivity, and should be <2.0 eV for adequate carrier mobilities. Thus, $E_{GAP}$ should be within a range from 1.4 eV to 2.0 eV. The melting point of the material should be within a range of >600 degrees C. to <1200 degrees C. A melting point ($T_{MP}$) of <1200 degrees C. is desirable for ease of growth and >600 degrees C. for strength. The maximum atomic number, $Z_{MAX}$ should be >50 to provide adequate stopping power. The material should have low defect density for long carrier lifetime $\tau_{CAR}$. The material should be non-hygroscopic and chemically and mechanically resilient to allow polishing, etching and lithography and cracking and evaporation of the material during growth should have manageable Table 1 below shows known materials with favorable band gaps. CZT (CdZnTe) meets most, but not all, of the preferred properties, and is currently the most promising RT semiconductor detector material. Its development and implementation, however, has been hampered by difficulty in simultaneously achieving high resistivity and long carrier lifetime. Telluride precipitates have been implicated as the recombination centers that shorten the carrier lifetime.

It has been suggested that AlSb potentially offers better fundamental properties, particularly because of the favorable bandgap and mobilities. Its hygroscopic nature has complicated the development of electrical contacts, however. The crystal also tends to grow with multiple domains and loses Sb as vapor during growth. CMT is another new material that has not yet been developed but has substantial promise. GaAs has essentially been abandoned because the carrier trapping is excessive. $HgI_2$ has a very high Z (high stopping power) but has been found to be extremely difficult and expensive to grow in large size. Ge exhibits ideal detection properties but demands cryogenic cooling to compensate for the small bandgap (in order to reduce the carrier population for high resistivity).

TABLE 1

Comparison of semiconductor properties of potential RT radiation detector materials

| Semiconductor | $E_{GAP}$ (eV) | $T_{MP}$ (° C.) | $Z_{MAX}$ | Carrier Lifetime | Mobility (cm²/Vs), hole/electron | Handling |
|---|---|---|---|---|---|---|
| CdZnTe (CZT) | 1.6 | 1077 | 52 | Precipitates trap electrons | 50/1000 | Fragile |
| CdMnTe (CMT) | 1.6 | 1075 | 52 | May be better than CZT | Low/~1000 | Fragile |

TABLE 1-continued

Comparison of semiconductor properties of potential RT radiation detector materials

| Semiconductor | $E_{GAP}$ (eV) | $T_{MP}$ (° C.) | $Z_{MAX}$ | Carrier Lifetime | Mobility (cm²/Vs), hole/electron | Handling |
|---|---|---|---|---|---|---|
| AlSb | 1.6 | 1065 | 51 | Trapping observed | 200/420 | Hygroscopic |
| GaAs | 1.4 | 1237 | 33 | EL2 trapping | 4000/8500 | Good |
| HgI₂ | 2.1 | 260 | 80 | ~2 microseconds | 4/100 | Very difficult to grow |
| Ge | 0.67 | 938 | 32 | >2 μsec | 3900/1900 | Excellent; Requires cryogenic cooling |

SUMMARY OF THE INVENTION

It is an object of the present invention to provide a high-performance room temperature (RT) gamma-ray detector.

Another object is to provide a RT semiconductor radiation detector that has resolution and size superior to CZT, while not requiring the cooling of Ge detectors.

These and other objects will be apparent based on the disclosure herein.

An embodiment of the invention is a gamma photon detector, comprising a GaTe crystal; a first metal contact in contact with said GaTe crystal; a second metal contact in contact with said GaTe crystal; and a means for applying a voltage across said GaTe crystal, wherein when a gamma photon generates carriers that are collected in said GaTe crystal, a current will be produced in said GaTe crystal. The detector also includes a means for measuring and characterizing said current. The GaTe crystal comprises a c axis that is preferentially oriented perpendicular to the direction of said voltage. Generally, the voltage is within a range from 100-10,000 V/cm and the GaTe crystal has a dimension of 0.1-10 cm. GaTe crystal can be grown, e.g., by a crystal growth method selected from the group consisting of physical vapor transport, chemical vapor transport, Czochralski technique, vertical Bridgman technique and horizontal Bridgman technique. It may be grown with a configuration selected from the group consisting of (i) with a Te excess, (ii) with at least one additional dopant and (iii) with a Te excess and with at least one additional dopant. At least one of said first metal contact or said second metal contact exhibits Schottky or Ohmic behavior. The crystal generally exhibits a resistivity of >10⁸ Ωcm. At least one of said first metal contact or said second metal contact may comprise indium. The GaTe semiconductor may also comprise selenium.

An embodiment of the invention is a method for detecting gamma photons, comprising providing a GaTe crystal with a first metal contact and a second metal contact in contact with said GaTe crystal; applying a voltage across said GaTe crystal; positioning said GaTe crystal in the path of at least one gamma photon, wherein when said gamma photon generates carriers that are collected in said GaTe crystal, a current will be produced in said GaTe crystal; and measuring and characterizing said current. The GaTe crystal in the method comprises a c axis that is preferentially oriented perpendicular to the direction of said electric field. Generally, the field is within a range from 100-10,000 V/cm and the GaTe crystal has a dimension of 0.1-10 cm. GaTe crystal can be grown, e.g., by a crystal growth method selected from the group consisting of physical vapor transport, chemical vapor transport, Czochralski technique, vertical Bridgman technique and horizontal Bridgman technique. It may be grown with a configuration selected from the group consisting of (i) with a Te excess, (ii) with at least one additional dopant and (iii) with a Te excess and with at least one additional dopant. At least one of said first metal contact or said second metal contact exhibits Schottky or Ohmic behavior. The crystal generally exhibits a resistivity of >10⁸ Ωcm, although >10¹⁰ Ωcm is needed. At least one of said first metal contact or said second metal contact may comprise indium. The GaTe semiconductor may also comprise selenium.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

GaTe has an ideal bandgap, a low melting point (no evaporation), a non-hygroscopic nature, a ready availability of starting materials and a simple binary formula (avoids component segregation in crystal). Table 2 shows the semiconductor properties of GaTe as a potential RT radiation detector material.

TABLE 2

| Semi-conductor | $E_{GAP}$ (eV) | $T_{MP}$ (° C.) | $Z_{MAX}$ | Carrier Lifetime | Mobility (cm²/Vs), hole/electron | Handling |
|---|---|---|---|---|---|---|
| GaTe | 1.6 | 836 | 52 | Unknown | 40/Unknown | Cleavage |

Hole mobilities are up to 40 cm²/Vs for propagation along the GaTe planes (perpendicular to the c axis), while it is ~100× less along the c axis (indicating that the c axis would need to be oriented perpendicular to the field direction in the radiation detector geometry). The relatively high value of the hole mobility is encouraging since the electron mobility would be considerably higher (~10x), placing it in a suitable range for radiation detection.

GaTe crystallizes in a monoclinic layer structure, where van der Waals bonds occur between the GaTe planes. There are both Ga—Te and Ga—Ga bonds within the planes of GaTe, in contrast to the usual tetrahedral metal-chalcogenide bonds of the zinc blend structure (e.g., CdTe). The crystal structure gives rise to anisotropy in the carrier mobility and thermal conductivity parallel and perpendicular to the c axis, being 100x and 7x greater, respectively. These anisotropies imply that the electric field would need to be oriented along the GaTe planes in the radiation detector, and that the temperature gradients in the furnace may need to be adjusted to avoid cracking or slip planes.

Hole mobilities have been reported by several authors to be up to 40 cm$^2$/Vs for propagation along the GaTe planes (perpendicular to the c axis), while it is ~100x less along the c axis as mentioned above. This relatively high value for the hole mobility leads to an expectation that the electron mobility will be considerably higher (~10x), placing it in a suitable range for radiation detection. Ga vacancies have been suggested to give rise to a shallow acceptor level at 0.15-0.18 eV above the valence band, which causes the material to be exclusively p-type. Ohmic contacts (~10$^{-5}$ Ωcm$^2$ with long term stability) have been obtained with indium metal followed by a 200 degrees C. anneal, which apparently leads to formation of an intermediate InTe layer. A standard Br$_2$/methanol solution, e.g., can be used for cleaning and etching the surfaces of GaTe before applying the electrode metal.

The requirements on a radiation detector in one embodiment were that it have a resolution R<0.5% at 662 keV, stopping power of >50% of 2" thick NaI scintillator detector and a background current $J_{BACK}$<6 nA/cm$^2$. The crystal requirements result from a flow-down from the device requirements. The GaTe crystal in this embodiment have a resistivity ρ of >3.4×10$^{11}$ Ωcm, electron mobility $\mu_e$ of >500 cm$^2$/Vs, carrier lifetime $\tau_{CAR}$>3 μsec, a crystal size $V_{XTAL}$ of >1×1×1 cm$^3$ and a breakdown voltage $E_{BREAK}$>1000 V/cm.

To explain the consistency of the device and crystal requirements, first note that the background current specification can be estimated with:

$$2.4(2I_{BACK}\tau_{MEAS}/q)^{1/2}/(E_\gamma/3E_{GAP})<0.5\%$$

where $E_\gamma/3E_{GAP}$ is the number of electrons generated for a 662 keV gamma ray and we are requiring a resolution of 0.5%. Taking the measurement time as $\tau_{MEAS}$=1 μsec, $I_{BACK}$ is calculated to be <6 nA. The resistivity can be calculated with:

$$I_{BACK}/L_{XTAL}^2=(E_{BREAK}/\rho)$$

yielding ρ=3.4×10$^{11}$ Ωcm for a 1 cm$^2$ area ($L_{XTAL}^2$) with a modest breakdown voltage of $E_{BREAK}$=1000 V/cm. The requirement on the transport of carriers, presumed to be electrons, may be described with:

$$\mu_e\tau_{CAR} E_{BREAK}>L_{XTAL}$$

which assures that all of the carriers are collected to yield the maximum resolution possible. Inserting the values from above we obtain 1.5 cm, compared to the crystal length of $L_{XTAL}$=1 cm.

Figure 1:
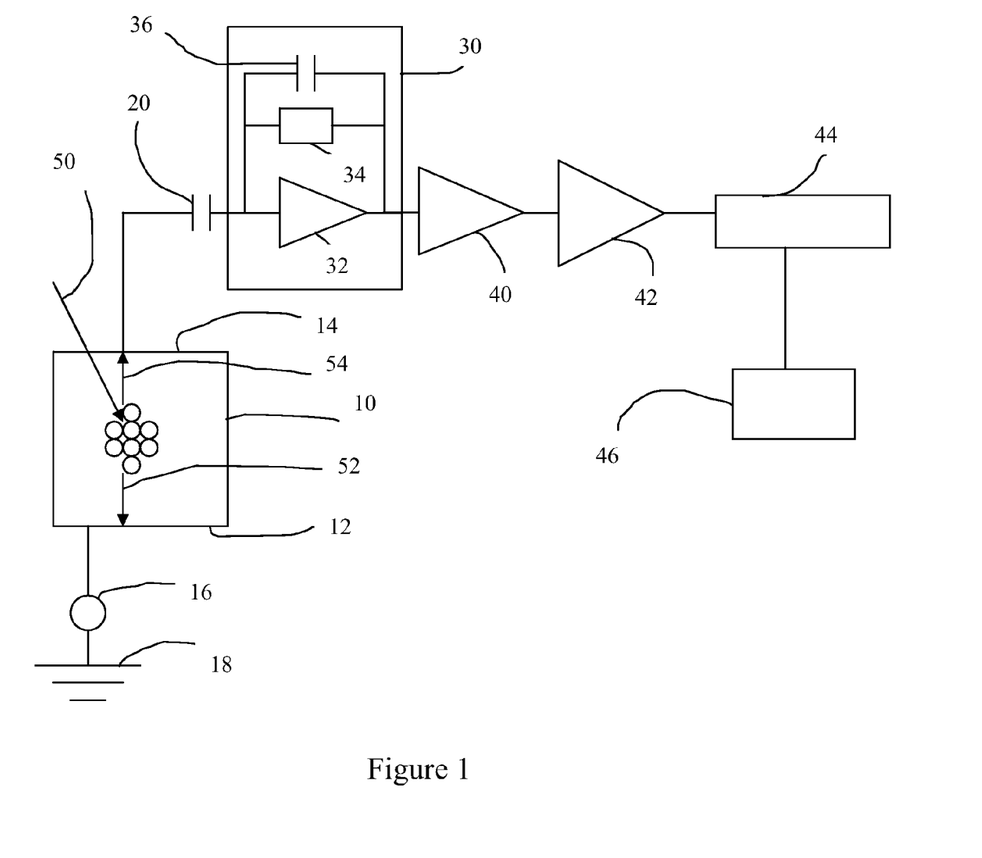
FIG. 1 illustrates an exemplary embodiment of a GaTe detector and its associated electronics.

FIG. 1 illustrates an exemplary embodiment of a GaTe detector and its associated electronics. Metal contact 12, used as the cathode, and metal contact 14, used as the anode, are operatively attached to the GaTe crystal 10. The metal contacts are ohmic contacts and are specifically indium. Metal contact 12 is connected to a high voltage (HV) source 16 which is connected to ground 18. HV source 16 applies a negative bias to the GaTe crystal 10. Metal contact 14 is electrically connected in series with capacitor 20, a first stage amplifier 30, a preamplifier 40, a shaping amplifier 42, a multi channel analyzer 44 and a computer 46. First stage amplifier 30 is an FET 32 in parallel with a resistor 34 and a capacitor 36. The figure illustrates a gamma photon 50 absorbed in the GaTe crystal 10, which initiates the migration of holes 52 toward metal contact 12 and electrons 54 toward metal contact 14. A histogram of the signals is displayed as counts versus energy.

One technical approach develops a viable pathway for achieving 0.5% resolution at 662 keV with the proposed new layered semiconductor detector having suitable size (efficiency), reduced cost, and readiness for wide-scale deployment. The highest technical risk associated with developing a GaTe detector relates to growing crystals with very low defect densities. This is achieved by resolving a number of significant issues.

Figure 2:
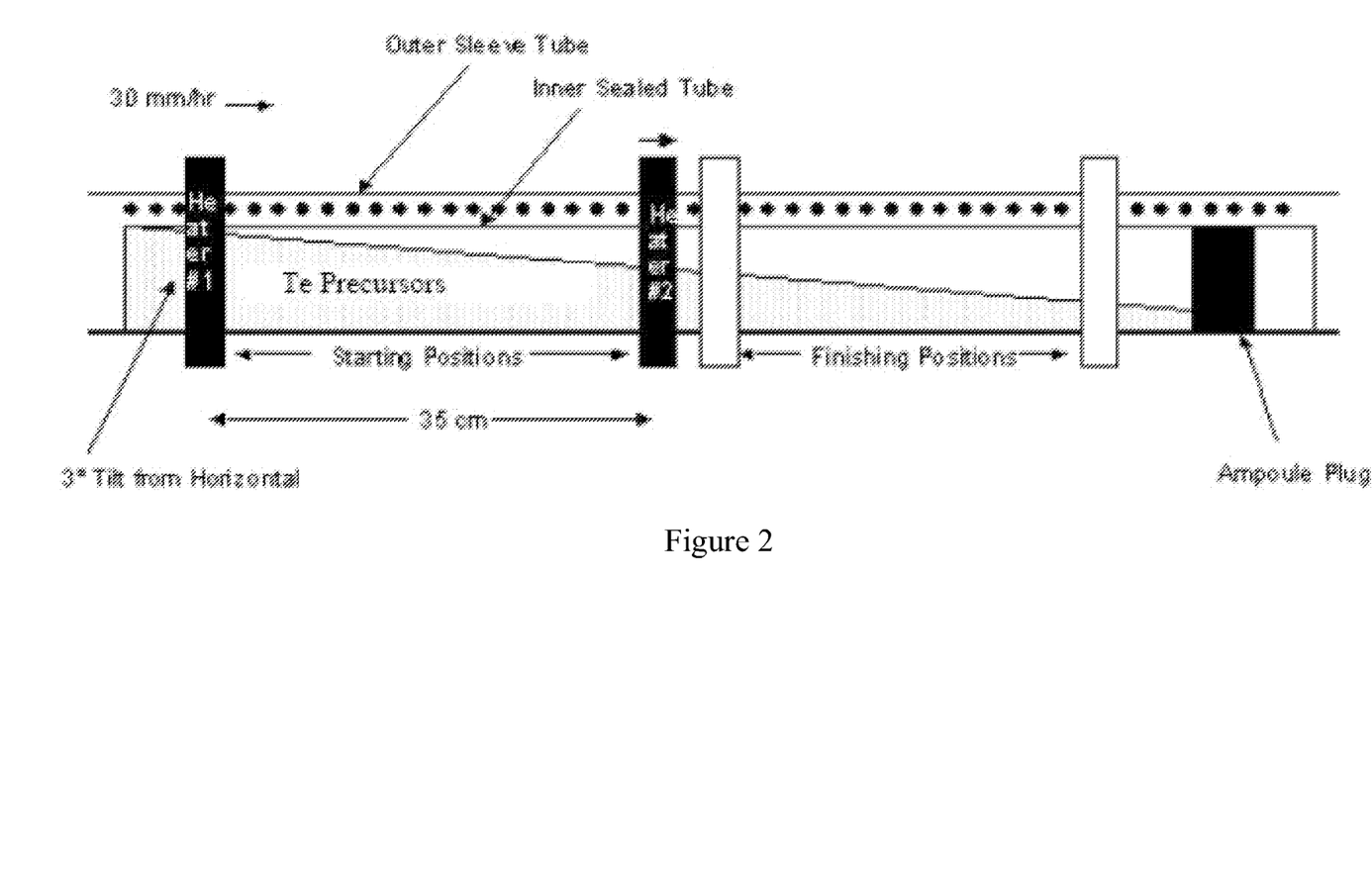
FIG. 2 illustrates a zone refiner.

Electronic properties of the grown crystals are potentially influenced by the presence of residual impurities, since they reduce the charge carrier transport properties. Thus for improvement in reproducibility of the grown crystal qualities, it is imperative that the purity (>6N) of the starting material is assured. Elemental Ga with high purity (>99.99999%) is commercially available. Commercially available high purity Te (≧7N) is somewhat expensive. However, the Te precursor materials (5N) can be purified using the horizontal multipass zone refining (ZR) process, e.g., by EIC Laboratories, Inc. This zone refining method is based on the fact that most impurities distribute differently in solid and liquid phases at equilibrium. If a section of solid material is melted (the 'zone') and passed slowly through the material, this will result in the re-distribution of impurities in the remaining solid. If this process is repeated many times (multi-pass zone refining), the resulting solid may become extremely pure at one end. FIG. 2 illustrates a zone refiner. In general, the solubility of impurities is larger in the liquid than in the solid phase; consequently impurities will be transported with the molten zone, leaving a purer material behind. The extent of zone refining purification depends on the impurity segregation coefficient, k=Cs/Cl, between the solid and liquid states; Cs is the impurity concentration in the solid phase and Cl in the liquid phase at thermodynamic equilibrium. A k value smaller than 1 (or larger than 1) implies a more effective purification with the zone refining. For k<1 impurities accumulate at the last to freeze end. For k>1 the impurities accumulate at the first to freeze end A multi-pass zone refining process enables the production of extremely high purity Te precursor materials.

One of primary difficulties in GaTe single crystal growth is its extremely low thermal conductivity along the c-axis (1.4 W/mK for GaTe) close to its melting temperature. This value is much lower than other semiconductors grown by the Bridgman method, e.g., Ge: 16 W/mK and CdTe: 2.91 W/mK. Also, the thermal conductivity is anisotropic (e.g., the thermal conductivity perpendicular to c-axis for GaTe is 8.7 W/mK). That means the radial conduction in the solid is more efficient for heat removal from the growth interface (relative to axial conduction) in GaTe growth. Anisotropy and liquid/solid conductivity ratios are expected to strongly influence the interface shape, which in turn affects twinning and other defects. Furthermore, the Prandtl numbers for GaTe is ~3.2, which is much larger than other semiconductors (e.g., Ge: 0.007 and CdTe: 0.406). In GaTe Bridgman growth, melt flow and heat transfer are strongly coupled. Thus, it is expected that any disturbance on melt flow from the pulling rate and/or rotation rate will significantly affect the temperature distribution, and consequently, the interface shape. It is therefore extremely important to properly control the melt flow, growth interface, and solute transport during crystal growth.

The understanding of inclusion formation and its dependence on parameters such as the crystal size, growth rate, and rotation rate is very important. To improve the crystal quality, it is very important to precisely control the temperature profile of the furnace during growth to avoid the interface shape change. Subsequently, the stress level in the crystal can also be reduced and dislocation formation and secondary nucleation can be avoided. Instability of solidification interface is controlled by temperature gradient in the crystal, G and pull rate, V. G/V should be greater than a certain value in order to avoid interface breakdown. A high temperature gradient in the crystal and a low pulling rate will benefit the interface stability. Achieving the dopant uniformity in the grown crystal also requires precise control of the melt flow for a near flat (slightly convex) solidification interface shape from the beginning to the end of the growth. Rotating the ampoule can introduce centrifugal force into the melt and change the fluid flow pattern. Also, it reduces the inhomogeneity in the azimuthal direction. For GaTe crystal growth, a ring heater may be crucial since radial thermal conductivity is much larger than the axial one. A ring heater in the "adiabatic" zone between the hot and cold zones can be added to locally heat the growth interface. It will provide an additional control to the interface shape, melt flow and dopant species distribution.

Achieving very high resistivity (i.e., free charge carrier densities on the order of $10^6$ cm$^{-3}$) is a particularly challenging aspect of developing all RT semiconductor detectors. In order to achieve high resistivity, the crystal can be grown slightly off-stoichiometry from Ga/Te-rich compositions. Compensating dopants such as Ge, Sn, Al or Cl as well as post-growth annealing can be used. Ga vacancies have been suggested to give rise to a shallow acceptor level at 0.15-0.18 eV above the valence band, which causes the material to be exclusively p-type. This vacancy population can be eliminated, e.g., by employing a Te excess in the melt. The phase diagram indicates that GaTe melts congruently. Te precipitates and inclusions can have deleterious effects by trapping electrons and holes. Their cumulative effect is expected to depend on several factors, including average size, distribution, and concentration of defects. Since Te is a component element of the host crystal, these would either be syngenetic or epigenetic inclusions. Syngenetic inclusions could result if the melt were to become Te rich at the growth front. Epigenetic inclusions could result from the coalescence of Ga vacancies. To reduce the concentration of Te precipitates, added extra Ga before the growth, reduce the amount of time at elevated temperatures during the ingot cool-down, and use post-growth annealing in different component overpressure and under controlled conditions (e.g., temperature gradients).

Figure 3A:
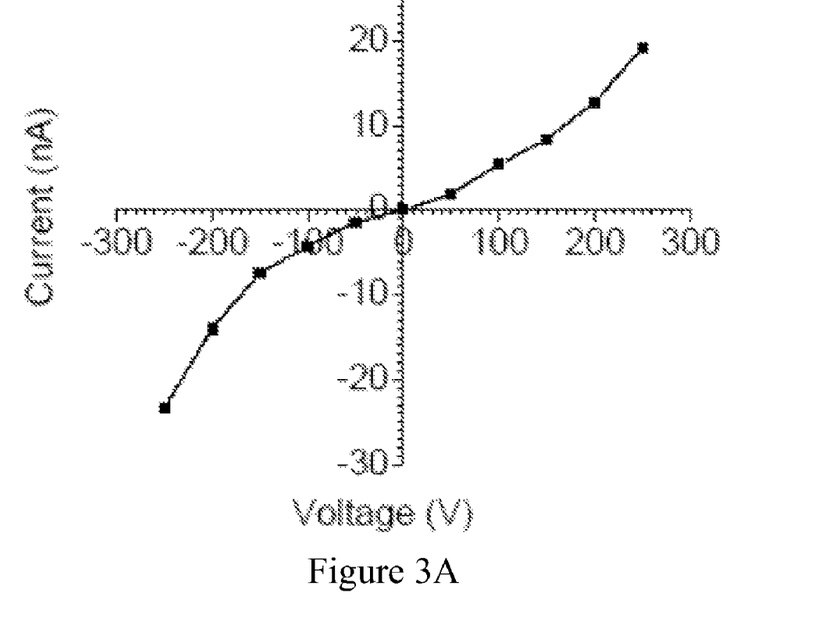
FIG. 3A shows the I-V characteristic and leakage current at −150 V (~8 nA) for an embodiment of the present invention.
Figure 3B:
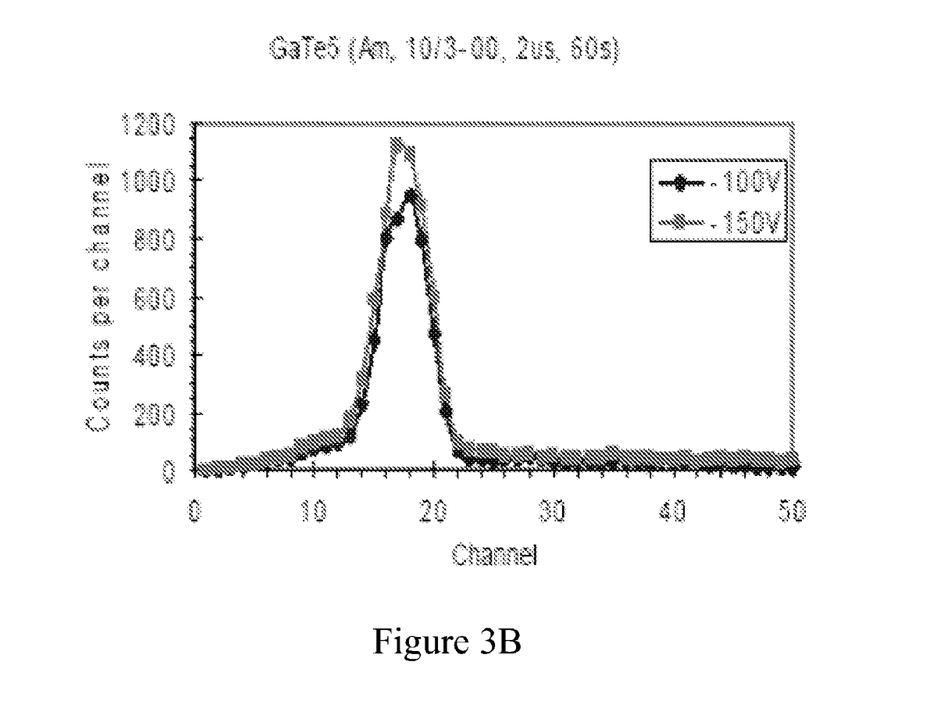
FIG. 3B shows the performance of the fabricated GaTe detectors as evaluated by irradiating the detector with a 241 Am source.
Figure 4:
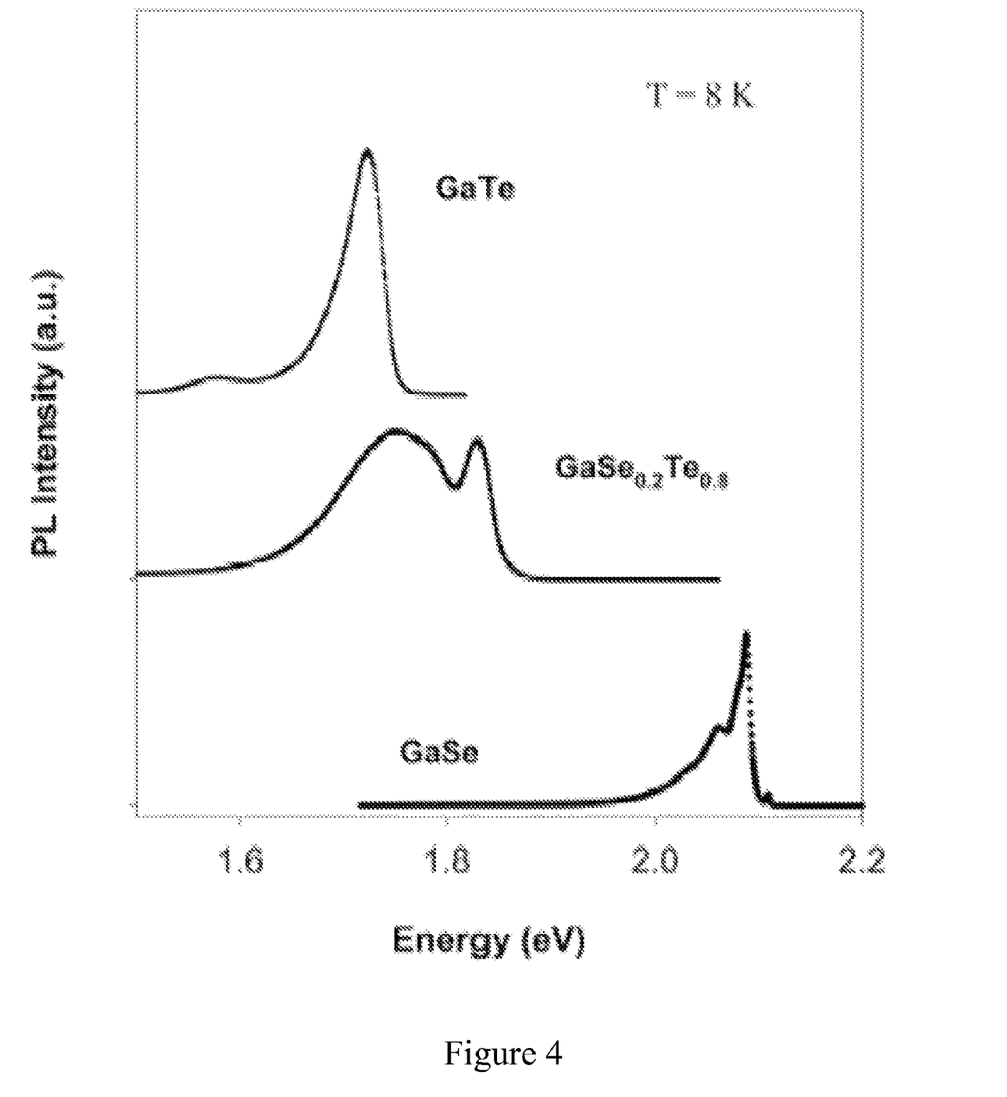
FIG. 4 compares the photoluminescence of GaTe, GaSe and GaSe0.2Te0.8.

Preliminary data on a GaTe detector of the present invention is presented in FIGS. 3A and 3B and shows promising detector performance. The I-V characteristic (FIG. 3A) shows a low leakage current at −150 V (~8 nA). The performance of the fabricated GaTe detectors were evaluated by irradiating the detector with a 241 Am source and presented in FIG. 3B which clearly identifies 60 keV energy peak. FIG. 4 shows a picture of a GaTe crystal grown and evaluated for its optical absorption and microscopic features. The absorption band edge is consistent with the predicted value; coarse polishing is observed to delineate the planar structure perpendicular to the c axis. Thus the results clearly show that GaTe is a useful material for radiation detector applications.

A GaSeTe ternary alloy can be fabricated according to the same process described for GaTe, except that the melting point is somewhat higher depending on the composition of the ternary alloy. Possible advantages that would result from the addition of selenium are: (i) increased hardness and (ii) increase energy bandgap and therefore higher achievable resistivities necessary for low noise operation. FIG. 4 compares the photoluminescence of GaTe, GaSe and GaSe0.2Te0.8.

Figure 5:
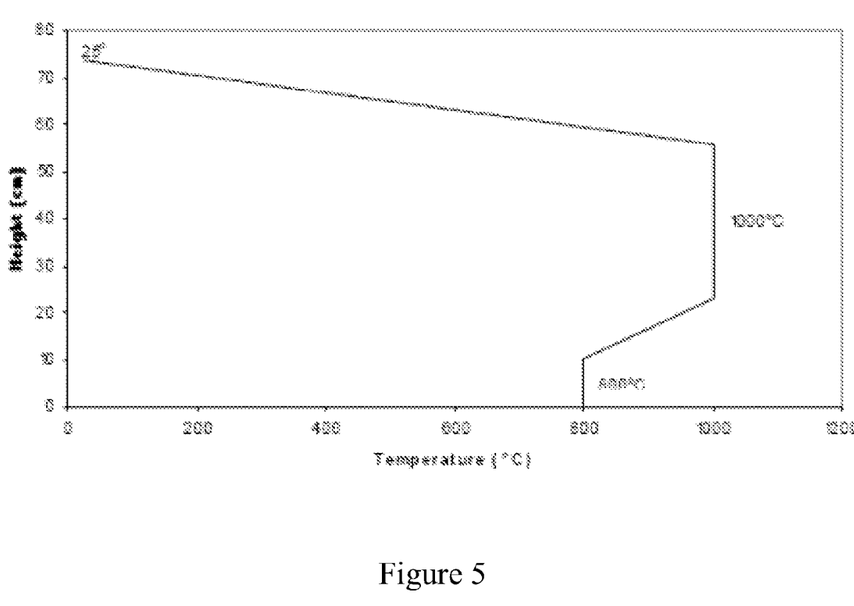
FIG. 5 shows a furnace temperature profile used for growing $GaSe_{0.5}Te_{0.5}$ crystals.

GaSe$_{0.2}$Te$_{0.8}$ was synthesized from high purity elements. 7N purity Ga from Alfa Aesar, 6N purity Se from Furukawa (Japan) and crystal grade quality Te from Honeywell was used for synthesis. A stoichiometric amount of the charge was loaded in a freshly cleaned quartz ampoule. The loaded ampoule was then sealed under dynamic vacuum of about $3\times10^{-7}$ torr. The sealed ampoule was the placed in a furnace placed at about 45 degree angle. The temperature of the furnace was raised slowly up to about 900 degrees C., and held there for few hours. The ampoule was kept rotating at about 15 rpm during synthesis. After completion of the synthesis, the temperature was slowly lowered down to room temperature. After completion of the synthesis, the material was taken out and immediately sealed in a conically tipped quartz ampoule for the subsequent growth experiment. The sealed ampoule was then placed in the vertical Bridgman furnace for the growth run. FIG. 5 shows a furnace temperature profile used for growing GaSe$_{0.5}$Te$_{0.5}$ crystals.

Two different compositions of GaSe$_{1-x}$Te$_x$ crystals (x=0.5 & 0.9) were grown at EIC Laboratories, Inc. Initially, GaSe$_{0.5}$Te$_{0.5}$ polycrystalline material was synthesized by combining 25.35 g of Ga (7N, Alfa Aesar), 14.37 g of Se (EIC zone refined), and 23.201 g of Te (7N). The other composition, GaSe$_{0.1}$Te$_{0.9}$, was synthesized by combining 25.05 g Ga (7N, Alfa Aesar), 2.88 g Se (EIC zone refined), and 41.83 g Te (7N). In both cases, the precursor materials were loaded in quartz ampoules and attached to a dynamic vacuum of $\sim1\times10^{-6}$ torr. The ampoules were then heated at 150 degrees C. overnight, and then sealed using a hydrogen-oxygen torch. The sealed ampoules were then slowly heated at a rate of 10 degrees C./hr with occasional rotation to a temperature of 950 degrees C., where they were held for 24 hours. The ampoules were then slowly cooled at a rate of 10 degrees C./hr.

In another process, a charge of 53.31 g of in-house synthesized polycrystalline GaSe$_{0.5}$Te$_{0.5}$ was placed into a quartz ampoule and heated under a dynamic vacuum of $1\times10^{-6}$ torr overnight. The ampoule was then sealed using a hydrogen-oxygen flame. A 3-zone vertical Bridgman furnace was then used. The ampoule was dropped through the 1000 degrees C. zones at a rate of 4 mm/hr while rotating at 15 rph. The vertical drop rate was then slowed to 1 mm/hr through the 1000 degrees C. to 800 degrees C. gradient. Once the ampoule was in the 800 degrees C. zone, it was cooled at a rate of 10 degrees C./hr.

References incorporated by reference:

G. Knoll, "Radiation Detection and Measurement," (John Wiley and Sons, 2000).

C. Szeles, S. Cameron, J.-O Chalmers, "Advances in the crystal growth of semi-insulating CdZnTe for radiation detector applications," IEEE Trans. Nucl. Sci. 51, 1242-1249 Part 3 (2004).

J. S. Iwanczyk, B. E. Patt, Y. J. Wang, and A. Kh. Khusainov, "Comparison of HgI$_2$, CdTe, and Si (p-i-n) X-ray detectors," Nucl. Instr. Meth. Phys. Research A 380, 186-192 (1996).

A C. Lin, E. Schoenherr, and H. Bender, "Growth and characterization of doped and undoped AlSb single crystals," J. Crys. Growth 104, 653-660 (1990).

A. Mycielski, A. Burger, M. Sowinska, M. Groza, A. Szadkowski, P. Wojnar, B. Witkowska, W. Kaliszek, and P. Siffert, "Is the (Cd,Mn)Te crystal a prospective material for x-ray and γ-ray detectors?", Phys. Stat. Sol. C2, 1578-1585 (2005).

D. S. McGregor, G. F. Knoll, Y. Eisen, and R. Brake, "Development of bulk GaAs room temperature radiation detectors," IEEE Trans, Nucl. Sci. 39, 1226-1236 (1992).

C. Manfredotti, R. Murri, and L. Vasanelli, "GaSe as nuclear particle detector," Nuclear Instruments and Methods 115, 349-353 (1974).

M. Abdel Rahman and A. Belal, "Single crystal growth and optical energy gap of gallium telluride," J. Phys. Chem. Solids 61, 925-929 (2000).

W. Milne and J. Anderson, "Threshold switching in gallium telluride single crystals," J. Phys. D 6, 2115-2124 (1973).

C. De Blasi, S. Galassini, C. Manfredotti, G. Micocci, and A. Tepore, "Double injection in GaTe," Lettere al Nuovo Cimento 23, 395-400 (1978).

G. Fischer and J. Brebner, "Electrical resistivity and Hall effect of single crystals of GaTe and GaSe," J. Phys. Chem Solids 23, 1363-1370 (1962).

C. Manfredotti, R. Murri, A. Rizzo, L. Vasanelli, and G. Micocci, "Electrical properties of GaTe grown by various methods," Phys. Stat. Sol. 29, 475-480 (1975).

R. S. Madatov, T. Tagiyev, I. Gabulov, and T. Abbasova, "Injection currents in lamellar crystals of gallium telluride," Semiconductor Physics 6, 278-281 (2003).

C. Coskun and H. Efeoglu, "Formation of low and stable Ohmic contacts to GeTe layered crystal," Semicond. Sci. Technol. 18, 23-27 (2003).

E. Salaev, D. Sh. Abdinov, and K. Askerov, "Perspective photoreceivers for visible and near infra-red region of the spectrum," http://kutuphane.taek.gov.tr/internet_tarama/dosyalar/cd/3881/Fundamental/Fundamental-36.PDF Y. Feutelais and B. Legendre, "Binary phase diagrams of tellurium and post-transitional elements (IB, IIB, IIIB, IVB, VB, VIB)," Thermochimica 314, 35-53 (1998).

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A gamma radiation detector comprising a single crystal of GaTe semiconductor as a medium to detect a high-energy ionization event.

2. The detector of claim 1, further comprising a plurality of electrodes deposited on said GaTe semiconductor, wherein when a voltage is applied across said electrodes and a gamma photon generates carriers in said GaTe semiconductor, a measurable current will be produced.

3. The detector of claim 2, wherein said GaTe semiconductor comprises a c axis that is oriented perpendicular to the direction of said voltage.

4. The detector of claim 2, wherein said voltage is within a range from 100-10,000 V/cm.

5. The detector of claim 2, wherein said electrodes exhibit Schottky or Ohmic behavior.

6. The detector of claim 2, wherein at least one electrode of said electrodes comprise indium.

7. The detector of claim 1, wherein said GaTe semiconductor has a dimension of 0.1-10 cm.

8. The detector of claim 1, wherein said GaTe semiconductor is grown by crystal growth method selected from the group consisting of physical vapor transport, chemical vapor transport, Czochralski technique, vertical Bridgman technique and horizontal Bridgman technique.

9. The detector of claim 1, wherein said GaTe semiconductor is grown with a Te excess.

10. The detector of claim 1, wherein said GaTe semiconductor is grown with at least one dopant.

11. The detector of claim 1, wherein said GaTe semiconductor is grown with a Te excess and with at least one dopant.

12. The detector of claim 1, wherein said semiconductor exhibits a resistivity of $>10^8 \Omega$ cm.

13. The detector of claim 1, wherein said GaTe semiconductor comprises selenium.

14. A gamma photon detector, comprising:
   a single crystal of GaTe;
   a first metal contact in operative contact with said single crystal of GaTe;
   a second metal contact in operative contact with said single crystal of GaTe; and
   means for applying a voltage across said single crystal of GaTe wherein when a gamma photon generates carriers in said single crystal of GaTe, a measurable current will be produced.

15. The detector of claim 14, further comprising means for measuring and characterizing said current.

16. The detector of claim 14, wherein said single crystal of GaTe comprises a c axis that is oriented perpendicular to the direction of said voltage.

17. The detector of claim 14, wherein said voltage is within a range from 100-10,000 V/cm.

18. The detector of claim 14, wherein said single crystal of GaTe has a dimension of 0.1-10 cm.

19. The detector of claim 14, wherein said single crystal of GaTe is grown by a crystal growth method selected from the group consisting of physical vapor transport, chemical vapor transport, Czochralski technique, vertical Bridgman technique and horizontal Bridgman technique.

20. The detector of claim 14, wherein said single crystal of GaTe is grown with a configuration selected from the group consisting of (i) with a Te excess, (ii) with at least one dopant and (iii) with a Te excess and with at least one a dopant.

21. The detector of claim 14, wherein at least one of said first metal contact or said second metal contact exhibits Schottky or Ohmic behavior.

22. The detector of claim 14, wherein said single crystal exhibits a resistivity of $>10^8 \Omega$ cm.

23. The detector of claim 14, wherein at least one of said first metal contact or said second metal contact comprises indium.

24. The detector of claim 14, wherein said single crystal of GaTe comprises selenium.

25. A method for detecting gamma photons, comprising:
   providing a single crystal of GaTe with a first metal contact and a second metal contact in contact with said single crystal of GaTe; and
   applying a voltage across said single crystal of GaTe, wherein when a gamma photon generates carriers in said single crystal of GaTe, a measurable current will be produced; and measuring said current.

26. The method of claim 25, wherein said single crystal of GaTe comprises a c axis that is oriented perpendicular to the direction of said voltage.

27. The method of claim 25, wherein said voltage is within a range from 100-10,000 V/cm.

28. The method of claim 25, wherein said single crystal of GaTe has a dimension of 0.1-10 cm.

29. The method of claim 25, wherein said single crystal of GaTe is grown by a crystal growth method selected from the group consisting of physical vapor transport, chemical vapor transport, Czochralski technique, vertical Bridgman technique and horizontal Bridgman technique.

30. The method of claim 25, wherein said single crystal of GaTe is grown with a configuration selected from the group consisting of (i) with a Te excess, (ii) with at least one dopant and (iii) with a Te excess and with at least one dopant.

31. The method of claim 25, wherein at least one of said first metal contact or said second metal contact exhibits Schottky or Ohmic behavior.

32. The method of claim 25, wherein said crystal exhibits a resistivity of $>10^8 \Omega$ cm.

33. The method of claim 25, wherein at least one of said first metal contact or said second metal contact comprises indium.

34. The method of claim 25, wherein said single crystal of GaTe comprises selenium.

* * * * *